United States Patent [19]

Lissit

[11] Patent Number: 4,801,071
[45] Date of Patent: Jan. 31, 1989

[54] METHOD FOR SOLDERING AND CONTOURING FOIL E-BEAM WINDOWS

[75] Inventor: Scott A. Lissit, Los Angeles, Calif.

[73] Assignee: The United States of America as represented by the Secretary of the Air Force, Washington, D.C.

[21] Appl. No.: 11,656

[22] Filed: Feb. 5, 1987

[51] Int. Cl.[4] .............................................. B23A 31/02
[52] U.S. Cl. .................................................... 228/212
[58] Field of Search ................. 228/212, 265, 183; 29/157.3 A, 157.3 R; 313/420

[56] References Cited

U.S. PATENT DOCUMENTS

| | | | |
|---|---|---|---|
| 3,650,017 | 3/1972 | Gal | 29/527.4 |
| 3,979,042 | 9/1976 | Peters | 228/183 |
| 4,072,262 | 2/1978 | Godrick et al. | 228/265 |
| 4,119,234 | 10/1978 | Kotschak et al. | 313/420 |
| 4,328,443 | 5/1982 | Zappa | 313/420 |
| 4,347,965 | 9/1982 | Grossman et al. | 228/107 |
| 4,362,965 | 12/1982 | Kendall | 313/420 |
| 4,423,351 | 12/1983 | Sugimori et al. | 313/420 |
| 4,558,736 | 12/1985 | Ziemek | 165/183 |
| 4,587,701 | 5/1986 | Koisuka et al. | 29/157.3 A |
| 4,591,756 | 5/1986 | Avnery | 313/420 |
| 4,613,069 | 9/1986 | Falke et al. | 228/263.17 |

*Primary Examiner*—M. Jordan
*Attorney, Agent, or Firm*—William Stepanishen; Donald J. Singer

[57] ABSTRACT

A method for soldering and contouring foil E-beam windows for an excimer laser using a two step procedure during soldering to prevent stressing the foil material. The foil material is plated with nickel and soldering material in narrow strips that are spaced slightly greater than the spacing between the coolant ribs. The excess foil material between the ribs forms the desired foil curvature between ribs. The foil is pressed into place on the pre-heated coolant ribs using a template that has a bottom surface shaped exactly as the desired foil contour. The foil is held in place until the solder melts and then solidifies. When the template is removed, a contoured foil window which has not been stressed or strained, remains.

5 Claims, 1 Drawing Sheet

METHOD FOR SOLDERING AND CONTOURING FOIL E-BEAM WINDOWS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a construction method for E-beam laser windows, and in particular to an apparatus and a process for soldering and contouring foil E-beam windows for excimer lasers.

In the prior art, previous foil prestrain techniques or procedures consisted of first soldering a section of foil material flat onto the cooling ribs on an excimer laser E-beam window. The spacing of nickel plating or solder strip on the foil material was identical to the spacing of the rib member. Then high pressure and high heat with hot oil were applied to the foil material to strain or stretch the foil into the desired shape. It has since been shown that this procedure significantly weakens the foils and reduces fatigue lifetimes. In addition, the presence of hot oil adds a greater risk that the foil material and the cooling rib to which it is attached, will become contaminated.

The state of the art of foil soldering techniques is well represented and alleviated to some degree by the prior art apparatus and approaches which are contained in the following U.S. Patents:

U.S. Pat. No. 3,650,017 issued to Gal on Mar. 21, 1972;
U.S. Pat. No. 3,979,042 issued to Peters on Sept. 7, 1976;
U.S. Pat. No. 4,072,262 issued to Godrick et al on Feb. 7, 1978;
U.S. Pat. No. 4,347,965 issued to Grossman et al on Sept. 7, 1982;
U.S. Pat. No. 4,558,736 issued to Ziemek on Dec. 17, 1985; and
U.S. Pat. No. 4,587,701 issued to Koisuka et al on May 13, 1986.

The Gal patent discloses a process for coating a workpiece of light metal or light metal alloy with soft solder which comprises working those surfaces of the workpiece which are to be coated in an oxygen-free medium and while excluding oxygen therefrom contacting said workpiece with a soft solder bath.

The Peters patent describes a method for vacuum brazing nickel to aluminum. The outer surface of the aluminum member to which the nickel member is to be brazed is precoated with a layer containing silicon and magnesium. The nickel and aluminum members are placed together in an oven at reduced pressures and heated to a temperature of approximately 593° C. cracking the oxide coating upon the aluminum sheet. The presence of magnesium and silicon in the surface of the aluminum sheets makes possible an excellent braze with a large filleted area.

The Godrick et al patent is directed toward a method of fabricating a solar heating unit having tubular conduits for containing high pressure fluids is disclosed. The method comprises the steps of forming a thin sheet of soft metal, preferably a fully annealed copper sheet, by applying sufficient temperature and pressure to creep or thermally form the sheet in a grooved plate using an assembly of fluid conduits having a paste solder applied thereon. The solder is melted during the creep forming step to form a good metallurigical bond between the sheet and the conduits.

The Grossman et al patent relates to a method of connecting thin metal sheets to metal tubes to form a solar collector plate which is carried out by explosive bonding to ensure a high thermal conductivity between sheet and tubes. The sheet is prepressed in a pattern of channels of substantially semicircular cross section conforming to the shape of the tube grid. A heavy supporting plate is provided, in its flat surface, with a similar pattern of channels, but in mirror symmetry; the tubes of the grid are completely filled with water and the grid is laid into the channels of the supporting plate. Then the grid is covered by the sheet, with the channels covering the tubes and the flat sheet portions in contact with the surface of the supporting plate. Explosive charges in ribbon shape are laid onto the sheet along the pieces of all channels on their outside, and the charges are detonated, whereafter the joined grid and sheet are removed from the plate.

The Ziemek patent presents a method of manufacture of a heat exchanger, particularly for solar collectors wherein a metal plate is continuously longitudinally welded to a metal tube centrally between the longitudinal edges of the plate. The width of the metal plate is greater than the outer diameter or cross sectional dimension of the tube and the metal plate is plastically deformed in deformation areas on both longitudinal sides so as to increase its surface in these respective areas between its longitudinal edges and short of the longitudinal line of welding contact with the tube. An undeformed region extends in the longitudinal direction of the tube between the deformation areas.

The Koisuka et al patent describes a method for producing an aluminum heat exchanger wherein a serpentine-type aluminum heat exchanger comprises a serpentine-anfractuous flat tube of an aluminum alloy, a plurality of corrugated fin units made of an aluminum alloy having a high aluminum content of 99 wt. % or more, and brazing metal coating layers fixed onto entire flat surfaces of parallel portions of the serpentine-anfractuous flat tube and for joining the flat tube and fin units, is produced by preparing the serpentine-anfractuous flat tube of an aluminum alloy, the corrugated fin units and U-shaped members of an aluminum alloy brazing filler metal, closely fitting the U-shaped members onto the parallel portions of the flat tube, disposing the fin units in spaces between adjacent U-shaped members fitted onto the parallel portions of the flat tube, and heating the flat tube, the fin units and U-shaped members in the assembled relation to the brazing temperature.

In the construction of E-beam windows for excimer lasers, a thin foil is soldered to a cooling rib support structure. It is important to the life and operation of the laser that the window foil is not weakened by this construction procedure, because long foil fatigue lifetimes are desireable in E-beam window designs for excimer lasers. In order to achieve E-beam windows with long fatigue lifetimes, the foil and the solder must be contoured to match the curvature of the rib surface, and also the foil must be curved in-between the ribs. This contouring reduces stress in the foil at the solder edge as well as increases the ability of the foil to resist thermal buckling. The problem is to obtain the desired foil contouring, without weakening the foil in the process. The present invention is directed to the method and apparatus of foil soldering and the contouring process to make E-beam windows for an excimer laser which will overcome some of the shortcomings of the prior art.

SUMMARY OF THE INVENTION

The present invention relates to the method of construction of E-beam windows for excimer lasers and is directed specifically to a method of soldering a very thin metal foil to a metal rib structure without causing stresses in the foil that might reduce its fatigue life. The foil is plated with parallel strips of nickel and lead-tin solder that are spaced apart slightly greater than the spacing of the parallel ribs to which the foil is to be attached. The method includes providing an excess amount of foil between the solder strips which is greater than the spacing between the ribs. This difference in spacing permits the foil to be formed into a desired curvature between the ribs. A forming block or template is utilized to force the foil into the desired shape as heat is applied to melt the solder.

It is one object of the present invention, therefore, to provide an improved apparatus and method for soldering and contouring foil E-beam windows.

It is another object of the invention to provide an improved apparatus and method for soldering and contouring foil E-beam windows wherein a foil material is plated for soldering at intervals greater than the rib spacing.

It is another object of the invention to provide an improved apparatus and method for soldering and contouring foil E-beam windows wherein an excess amount of foil material is utilized to produce the desired curvature.

It is still another object of the invention to provide an improved apparatus and method for soldering and contouring foil E-beam windows in which a template that is contoured to exactly the desired foil shape is used to align and attach the foil to the hot ribs.

It is yet another object of the invention to provide an improved apparatus and method for soldering and contouring foil E-beam windows in which the foil material is shaped to the desired contour without being strained, stressed, or weakened.

It is still another object of the invention to provide an improved apparatus and method for soldering and contouring foil E-beam windows wherein no hot oils are used in the process and thereby which the foil and the cooling ribs are kept free of potential contaminants.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
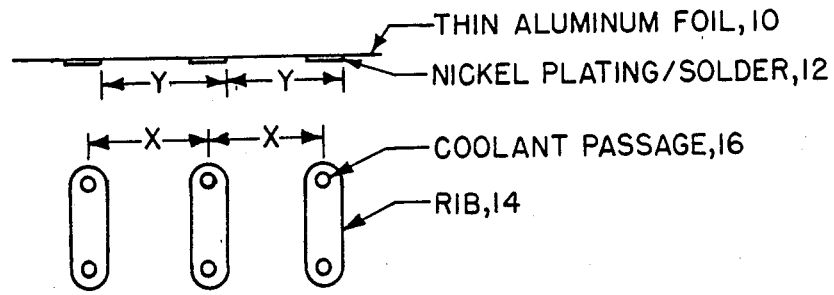
FIG. 1 is a schematic view of the elements utilized in the method for soldering and contouring foil E-beam windows.

Referring now to FIG. 1 there is shown the elements that will be utilized to form an E-beam window for an excimer laser. A thin foil material 10 which may comprise aluminum or some other such suitable material, has affixed to its bottom surface strip 12 of plating/soldering material. For the present illustrative example, only three coolant rib members 14 from an excimer laser is shown for descriptive convenience. A corresponding number of strips 12 are also shown. It may be noted that the coolant rib members 14 each contain a pair of coolant passages 16. The relative spacing between the coolant rib members 14 is designated by the character X. The relative spacing between the strips 12 is designated by the character, Y. The length of Y is greater than the length of X.

Figure 2:
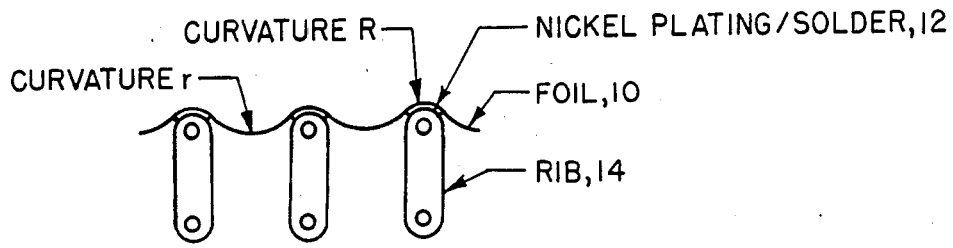
FIG. 2 is a schematic view of the foil E-beam window elements after use of the method.

Turning now to FIG. 2, there is shown a view of the E-beam window elements wherein the present method has been utilized to form a foil E-beam window. It was pointed out in FIG. 1 that the foil 10 is plated with strips 12 of plating/solder such that the distance Y is greater than the distance X. The difference in dimension $(Y-X)$ provides an excess amount of foil 10, relative to the distance between the coolant rib members 14, to account for the curvature r in the foil material between the coolant rib members. The foil 10, the strips 12 of plating/soldering material have a curvature R over the coolant rib members 14. The curvature R corresponds to the radius of curvature of the collant passage ends of the coolant rib members 14. Thus, it may be seen that the foil 10 has been soldered to the coolant rib members 14 without any undue stretching of material therebetween and or without any stress induced fatigue in the foil material between the coolant rib members. The purpose of the foil 10 in excimer laser structure is two fold. The foil 10 serves as a wall between a vaccum chamber wherein electron beams are generated and a high pressure lasing region. In the passage of electrons through the foil window, heat is generated in the foil by the electrons that strike it as they pass through. The foil material 10 which comprises a heat conducting material such as aluminum, conducts the generated heat to the coolant rib members 14 for dissipation thereby. The coolant rib members 14 each have a pair of coolant passages 16 therein through which a coolant medium is passed to withdraw the generated heat from the structure. Thus, it should be noted that the coolant rib members 14 may comprise any suitable commercially available material, such as aluminum, that is a good conductor of heat, as long as its magnetic properties are such that it does not interfere with the E-beam passing beside it. It should also be noted that the strip 12 may comprise a nickel plating that is first applied to the foil bottom surface by a process, such as vapor deposit, to provide a good base for the adhesion of the soldering material.

Figure 3:
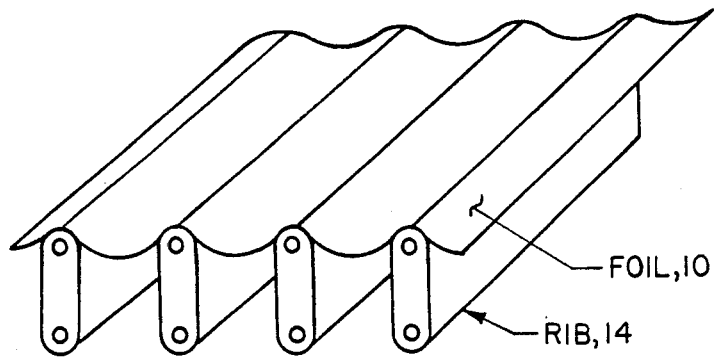
FIG. 3 is a perspective view of a foil E-beam window according to the present invention.

In FIG. 3 there is shown a perspective view of the foil E-beam window wherein it may be seen that the coolant rib members 14 are arranged with a predetermined spacing therebetween. The spacing between the coolant rib members is fixed relative to each other and is such that the coolant members are substantially parallel to each other.

Figure 4:
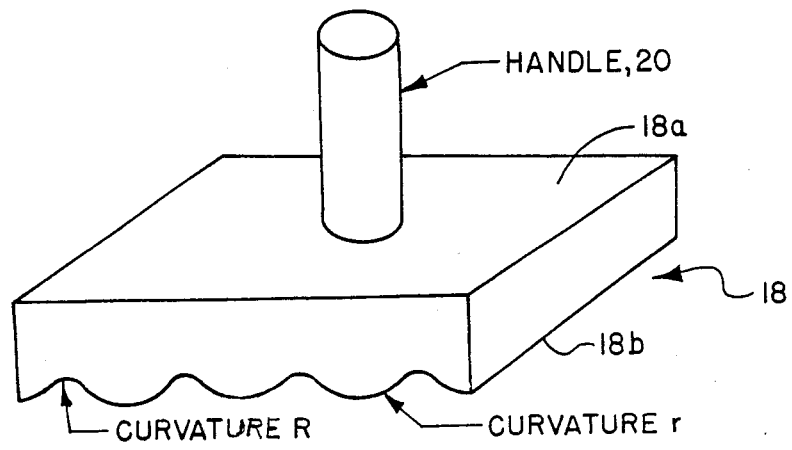
FIG. 4 is a perspective view of the template apparatus that is utilized during the foil soldering and contouring process.

In FIG. 4 there is shown a perspective view of the template apparatus 18 that is utilized in the process of attaching and contouring the foil material to the hot coolant rib members during the soldering operation.

The top surface 18a of the template apparatus 18 is substantially flat and contains a handle 20 for convenience of operation. The bottom surface 18b of the template apparatus is shaped and contoured exactly as the shown desired foil contour. The template apparatus 18 utilizes the curvature R and the curvature r to exactly establish a contoured surface template for the formation of the E-beam windows.

The present method and process of soldering and contouring a foil E-beam window comprises a two step operation to achieve the proper foil contour during the soldering procedure without stressing the foil material. The method of soldering and contouring the foil E-beam window comprises the following steps:

1. The foil material is nickel plated for soldering along narrow strips the same width as the coolant rib members. However, the spacing between the strips is slightly greater than the spacing between the coolant rib members. This spacing will provide excess of foil material between the coolant rib members which will then form the desired curvature in the foil material between the coolant rib members. The desired foil curvature is shown in FIG. 2 as curvature r.

2. The foil material is pressed into place on the preheated coolant rib members. The template apparatus which was described in FIG. 4 is a template that has a bottom surface shaped exactly as the desired foil contour. The foil material is held in contact with the coolant rib members while the solder melts and takes on the curvature R as shown in FIG. 2. When the solder cools and solidifies, the template apparatus is removed and the resulting structure is a contoured foil which has not been stressed or strained.

It is important to hold the foil material firmly in place and in the correct shape during the soldering process because actual foil/rib modules can be as large as 10×50 cm. While the template apparatus may be constructed from a metal material such as stainless steel or aluminum, it shoud be noted that the preferred material for the template apparatus should compirse a material with low thermal conductivity so that heat will not be drawn from the coolant rib members before the solder can flow into the proper curvature.

This process may also be used on all E-beam windows that require a thin foil for minimum energy loss and maximum strength characteristics. Excimer lasers use such a foil to separate high vacuum regions from high pressure regions while allowing the passage of electrons through the foil.

Although the invention has been described with reference to a particular embodiment, it will be understood to those skilled in the art that the invention is capable of a variety of alternative embodiments within the spirit and scope of the appended claims.

What is claimed is:

1. A method for soldering and contouring foil E-beam windows comprising the steps of:
   plating a foil material with narrow strips of a first predetermined material with a first predetermined spacing between the strips,
   applying a second predetermined material to said narrow strips,
   heating coolant rib members which have a second predetermined spacing therebetween to a predetermined temperature,
   placing said narrow strips in contact with said coolant rib members, and
   maintaining said narrow strips in contact with said coolant rib members while said second predetermined material melts, cools and then solidifies to form a high strength bond between said narrow strips and said coolant rib members to attach said foil material to said coolant rib members and thereby form a foil E-beam window.

2. A method as claimed in claim 1 wherein said first predetermined spacing is greater than said second predetermined spacing.

3. A method as claimed in claim 1 wherein said first predetermined material comprises a nickel material.

4. A method as claimed in claim 1 wherein said second predetermined material comprises a solder material.

5. A method as claimed in claim 2 wherein the difference between the first predetermined spacing and the second predetermined spacing provides an excessive amount of foil material to form a first and second curvature, said first curvature being formed between said coolant rib members, said second curvature being formed over said coolant rib members.

* * * * *